United States Patent
Jaggi (10) Patent No.: US 9,667,728 B2
(45) Date of Patent: May 30, 2017

(54) CONTROLLER OFFLOADING

(71) Applicant: Aruba Networks Inc., Sunnyvale, CA (US)

(72) Inventor: Mohit Jaggi, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 380 days.

(21) Appl. No.: 14/069,227

(22) Filed: Oct. 31, 2013

(65) Prior Publication Data

US 2015/0120799 A1 Apr. 30, 2015

(51) Int. Cl.
*H04L 29/08* (2006.01)

(52) U.S. Cl.
CPC .................................. *H04L 67/14* (2013.01)

(58) Field of Classification Search
CPC ........... H04L 65/4076; H04L 29/06027; H04L 45/22; H04L 29/06319; H04L 45/00; H04L 47/00; H04L 65/1066; H04L 67/10; H04L 43/0876; H04L 29/06; H04L 67/14; H04L 29/08; H04N 21/26283; H04N 21/64322; H04W 88/06; H04W 36/22; H04W 76/02; H04W 76/023; H04W 36/0011; H04W 76/021; H04W 88/12
See application file for complete search history.

(56) References Cited

U.S. PATENT DOCUMENTS

| | | | | |
|---|---|---|---|---|
| 6,081,715 A * | 6/2000 | La Porta | ............ | H04Q 11/0478 370/312 |
| 6,085,101 A * | 7/2000 | Jain | ........................ | H04H 20/67 370/312 |
| 6,895,236 B2 * | 5/2005 | Shuster | .................... | H04M 3/02 455/410 |
| 7,050,445 B1 * | 5/2006 | Zellner | ............... | H04L 12/5695 370/233 |
| 7,420,981 B2 * | 9/2008 | Zellner | ............... | H04L 12/5695 370/352 |
| 8,028,071 B1 * | 9/2011 | Mahalingam | ....... | G06F 9/45558 370/254 |
| 8,265,018 B2 * | 9/2012 | Zellner | ............... | H04L 12/5695 370/329 |
| 8,422,939 B2 * | 4/2013 | Narasimhan | .......... | H04L 12/185 370/270 |
| 8,718,007 B2 * | 5/2014 | Zellner | ............... | H04L 12/5695 370/329 |
| 2002/0089960 A1 * | 7/2002 | Shuster | .................... | H04M 3/02 370/338 |

(Continued)

*Primary Examiner* — Sargon Nano (74) *Attorney, Agent, or Firm* — Brooks, Cameron & Huebsch, PLLC (57) ABSTRACT

A non-transitory computer readable medium storing instructions which, when executed by one or more hardware processors, causes performance of operations including: performing, by a controller, one or more processing actions for data corresponding to a particular session associated with a client device; identifying one or more characteristics corresponding to the particular session; based on the one or more characteristics corresponding to the particular session: selecting a network device, other than the controller, to perform the one or more processing actions for the data corresponding to the particular session; causing the network device to perform the one or more processing actions, for the data corresponding to the particular session, instead of the controller.

17 Claims, 5 Drawing Sheets

(56) References Cited

U.S. PATENT DOCUMENTS

| | | | |
|---|---|---|---|
| 2004/0073716 A1* | 4/2004 | Boom | H04L 69/12 709/250 |
| 2007/0121604 A1* | 5/2007 | Chandra | H04L 29/06027 370/356 |
| 2009/0116463 A1* | 5/2009 | Hirano | H04W 8/26 370/338 |
| 2009/0225779 A1* | 9/2009 | Diab | H04J 3/0641 370/469 |
| 2011/0116499 A1* | 5/2011 | Lim | H04L 45/22 370/355 |
| 2011/0274108 A1* | 11/2011 | Fan | H04L 12/4633 370/390 |
| 2013/0013664 A1* | 1/2013 | Baird | H04L 67/025 709/203 |
| 2014/0301202 A1* | 10/2014 | Bouazizi | H04W 28/0289 370/235 |
| 2015/0117331 A1* | 4/2015 | Zellner | H04L 12/5695 370/329 |

* cited by examiner

CONTROLLER OFFLOADING

BACKGROUND

Computer networks allow users to connect to other users and to various services and sources of content. For example, using a client device, the user may receive information from a remote location. Although all network devices in a computer network usually handle some network traffic (e.g., packets), the workload can vary considerably among the network devices. In other words, some network devices may operate close to maximum capacity, while other network devices may be underutilized. This may have a negative impact on network performance and throughput.

OVERVIEW

In general, in one aspect, one or more embodiments relate to a non-transitory computer readable medium (CRM) comprising instructions which, when executed by one or more hardware processors, causes performance of operations. The operations comprise: performing, by a controller, one or more processing actions for data corresponding to a particular session associated with a client device; identifying one or more characteristics corresponding to the particular session; based on the one or more characteristics corresponding to the particular session: selecting a network device, other than the controller, to perform the one or more processing actions for the data corresponding to the particular session; causing the network device to perform the one or more processing actions, for the data corresponding to the particular session, instead of the controller.

In general, in one aspect, one or more embodiments relate to a system. The system comprises: at least one device including a hardware processor; the system being configured to perform operations comprising: performing, by a controller, one or more processing actions for data corresponding to a particular session associated with a client device; identifying one or more characteristics corresponding to the particular session; based on the one or more characteristics corresponding to the particular session: selecting a network device, other than the controller, to perform the one or more processing actions for the data corresponding to the particular session; causing the network device to perform the one or more processing actions, for the data corresponding to the particular session, instead of the controller.

In general, in one aspect, one or more embodiment relate to a method. The method comprises: performing, by a controller including a hardware processor, one or more processing actions for data corresponding to a particular session associated with a client device; identifying one or more characteristics corresponding to the particular session; based on the one or more characteristics corresponding to the particular session: selecting a network device, other than the controller, to perform the one or more processing actions for the data corresponding to the particular session; causing the network device to perform the one or more processing actions, for the data corresponding to the particular session, instead of the controller.

Other aspects of the embodiments will be apparent from the following description and the appended claims.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that some embodiments may be practiced without these specific details. In other instances, well-known features have not been described in detail to avoid unnecessarily complicating the description.

In general, embodiments are directed towards a method, a non-transitory computer-readable medium, and a system for performing controller offloading. Specifically, within a secondary network such as an IP subnet, a controller may be required to process (i.e., perform processing actions on) multiple sessions associated with one or more client devices. In order to prevent overloading of the controller, one or more of the sessions are offloaded to other network devices (e.g., switches, access points, other controllers, etc.) within the secondary network. In other words, the network device is configured, at least temporarily, to perform the processing action(s) on the sessions. This reduces the burden on the controller.

Figure 1:
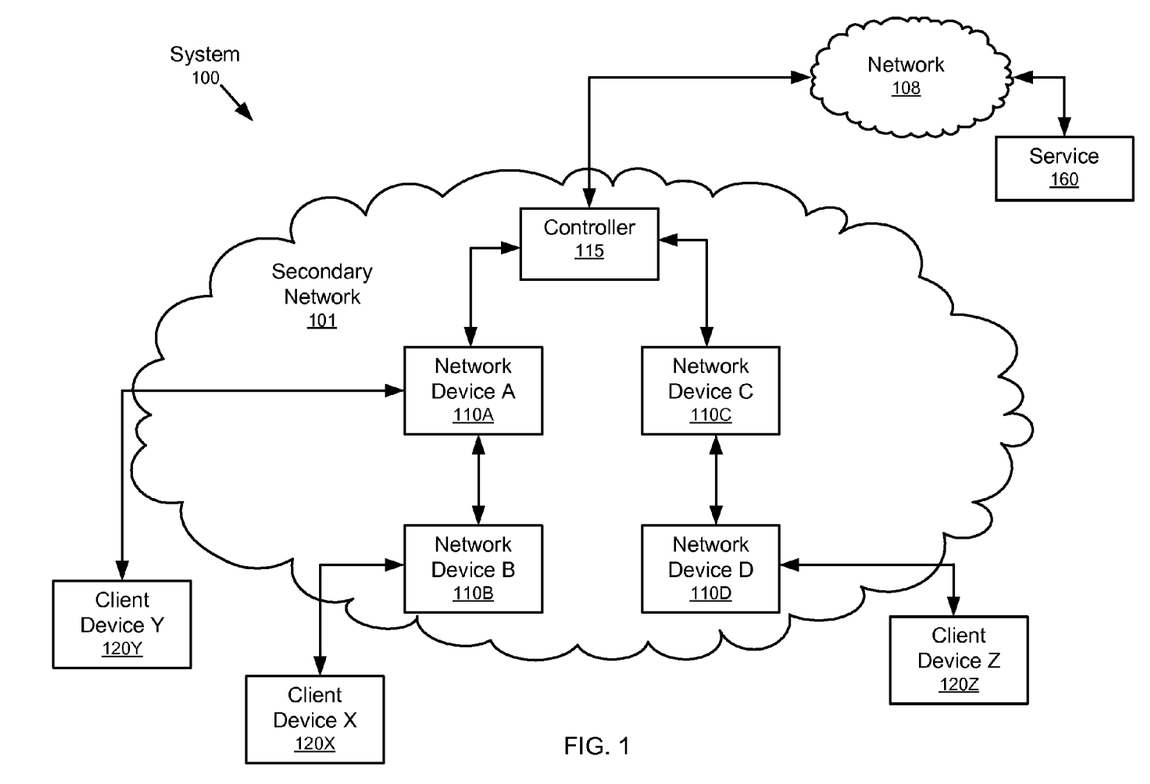
FIG. 1 shows a system in accordance with one or more embodiments.

FIG. 1 shows a system (100) in accordance with one or more embodiments. As shown in FIG. 1, the system (100) has multiple components including a network (108) operatively connecting a service (160) with a secondary network (101). The secondary network (101) has multiple devices including a controller (115) and one or more network devices (e.g., Network Device A (110A), Network Device B (110B), Network Device C (110C), Network Device D (110D)). Further, system (100) also includes multiple client devices (e.g., Client Device X (120X), Client Device Y (120Y), Client Device Z (120Z)) connected to one or more of the network devices (110A, 110B, 110C, 110D).

In one or more embodiments, each client device (120X, 120Y, 120Z) is a computing system. In one or more embodiments, a client device may be a station. For example, the client device may be a mobile device (e.g., laptop computer, smart phone, personal digital assistant, tablet computer, or other mobile device), desktop computer, server, blade in a server chassis, or any other type of computing device or devices that includes at least the minimum processing power, memory, and input and output device(s) to perform one or more embodiments. The client devices may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor.

In one or more embodiments, each client device (120X, 120Y, 120Z) is a source (i.e., generator) of packets and/or a sink (i.e., destination) for packets. The packets may be organized into one or more sessions (e.g., HTTP session, web session, TCP session, etc.) and each session corresponds to an application executing on the client device. For example, one session may correspond to a video clip (i.e., streaming media) being viewed by the operator/user of client device X (120X). As another example, one session may correspond to a Voice over IP (VoIP) call in which the user/operator of client device X (120X) is a participant. In other words, each session is of a specific type and/or associated with a specific application. Each packet in a session may be created by or destined for a another client device and/or the service (160) accessible via the network (108).

In one or more embodiments, the controller (115) obtains characteristics about each packet or session that it handles. Specifically, the controller (115) may obtain some characteristics by inspecting the header of the packet(s). The controller may obtain some characteristics by performing a deep packet inspection. The controller (115) may obtain some characteristics of the packet session from a third-party application and/or a user. Example characteristics include the sender IP address, the destination IP address, the type of the session, the application (e.g., the client device application) generating and/or receiving the packets, a software application port used by the client device to transmit or receive the data corresponding to the particular session, etc.

In one or more embodiments, the controller (115) is a standalone device that can configure a set of one or more access points or other network devices. In one or more embodiments, the controller (115) is a virtual controller implemented by an access point for configuring a set of one or more other access points.

In one or more embodiments, the controller (115) is configured to identify the expected amount of data (in bytes, MBs, GBs, etc.) to be transmitted during a session or an actual amount of data already transmitted during the session. This is a characteristic of the session. In one or more embodiments, the controller (115) is configured to identify the expected duration (e.g., in seconds, milliseconds, cardinality of packets, etc.) of a session and/or a value indicating whether an actual duration of the particular session has exceeded a threshold value. These are also characteristics of the session. The expected amount of data to be transmitted during the session and/or the expected duration of the session may be identified based on other characteristics of the session. For example, sessions associated with streaming media (e.g., video) and/or VoIP have more data and last longer than downloads of documents or even images.

In one or more embodiments, the controller (115) performs processing actions on the packets. Specifically, the controller (115) performs one or more processing actions on the packet of a session based on the characteristics of the session. Example processing actions may include applying a quality of service (QoS) to the session, redirecting the session to the service (160), encapsulating a packet of the session in a mobility tunnel, dynamic multicast optimization, station state management, authentication and 802.1x, roaming, MDNS proxy, firewall/centralized crypto, sending monitoring feed to monitoring agents (SNMP etc), intrusion detection coordination, ARM channel power coordination, DHCP service, 8021x termination, deep packet inspection, and Voice ALGs and handling voice calls (tag for appropriate prioritization).

In one or more embodiments, each session is represented/identified by a key. The key for a session may be generated by applying a hash function to an N-tuple of characteristics/attributes belonging to the session. Accordingly, each key uniquely identifies a session. In one or more embodiments, the controller (115) maintains a key data structure (DS) (e.g., key table) (not shown). The key DS maps a set of keys to a set of processing actions. In other words, the key DS specifies what processing actions are to be performed on a packet corresponding to a given key. The controller (115) is configured to calculate a key for an incoming packet, and then perform the processing actions corresponding to the key, as specified in the key DS.

In one or more embodiments, the system (100) includes multiple network devices (110A-110D). A network device is a hardware device that is configured to receive packets (e.g., unicast packets, multicast packets) and transmit the packets to the client devices connected to the network device and roamed client devices of the network device. A network device might also be configured to receive packets from a client device and transmit the packet to the network (108), to other network devices, and/or to other client devices. The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. Each network device (110A-110D) may correspond to a wired or wireless access point, a controller, an access point that includes the functionality of a controller, a switch (e.g., mobility access switch), or other such device.

In one or more embodiments, the network devices (110A-110D) have the functionality to perform processing actions. In other words, one or more of the network devices (110A-11D) have the necessary hardware, software, firmware, or any combination thereof to perform all or a subset (e.g., at least one) of the processing actions that the controller (115) performs. Like the controller (115), the network devices (110A-110D) may also have a key DS that map keys to processing actions. Each key DS may be updated over time (discussed below).

In one or more embodiments, the controller (115) includes a device DS that identifies the functionality of each network device (110A-110D) in the system (100). In other words, the device DS specifies the processing action(s) that each network device (110A-110D) could perform.

Those skilled in art, having the benefit of this detailed description, will appreciate that the controller (115) may handle many packets/sessions and thus perform many complex processing actions. Accordingly, it is possible that the controller (115) may become overloaded and potentially reduce the overall performance/throughput of the system (100).

In one or more embodiments, the controller (115) is configured to offload processing of the session to a network device, assuming the network device(s) is capable (i.e., has the necessary hardware, software, firmware, etc.) of performing the required processing actions on the session. The decision to offload processing of the session to the network device is based on the characteristics of the session. For example, if the amount of data expected to be transmitted during the session is large and/or the duration of the session is expected to be long, the session may be a candidate to be offloaded. By offloading processing of the session to another network device, the burden on the controller (115) is reduced and computing resources on the controller (115) are made available for other tasks.

In one or more embodiments, the controller (115) is configured to offload a session to a network device(s) by populating the key DS of the network device(s) with the key and the processing actions that should be performed on any incoming packets corresponding to the key. Accordingly, the network device(s) will calculate the key (e.g., via a hash function) for any incoming packet, and perform the processing action(s) specified in the key DS of the network device.

Those skilled in the art, having the benefit of this detailed description, will appreciate that the population of a network device's key DS is only one way for the controller (115) to offload the processing of a session to the network device. The controller (115) may offload the processing of any session by configuring hardware (i.e., circuitry), software, and/or firmware of the network device to perform the required processing actions on the session. However, this offloading may only be temporary. In other words, the controller (115) is free to modify (i.e., change the number and type of processing actions) or even revoke all processing actions that have been offloaded to a network device (110A-110C) at any time. These modifications and/or revocations may be in response to the changing computational workload of the controller (115).

In one or more embodiments, once the controller (115) has offloaded the processing of the session to the network device, this causes the network device to perform processing actions that were previously performed by the controller (115). In some embodiments, the network device may perform processing actions on the packets of a session prior to transmitting the processed packets to the controller (115). Additionally or alternatively, the controller (115) may forward unprocessed packets of the session to the network device in order for the network device to perform processing actions on the packets. Additionally or alternatively, the network device may now circumvent the controller for transmission of the packets toward a destination device.

Still referring to FIG. 1, client device X (120X) and the controller (115) may be separated by one or more network devices (110A-110D). Each network device that separates the controller (115) from client device X (120X) corresponds to a "hop" in the packet path between client device X (120X) and the controller (115). In one or more embodiments, the controller (115) is configured to offload the processing of the session to a network device that is closer (i.e., fewer hops, shorter distance, etc.) to the client device associated with the session.

Figure 2:
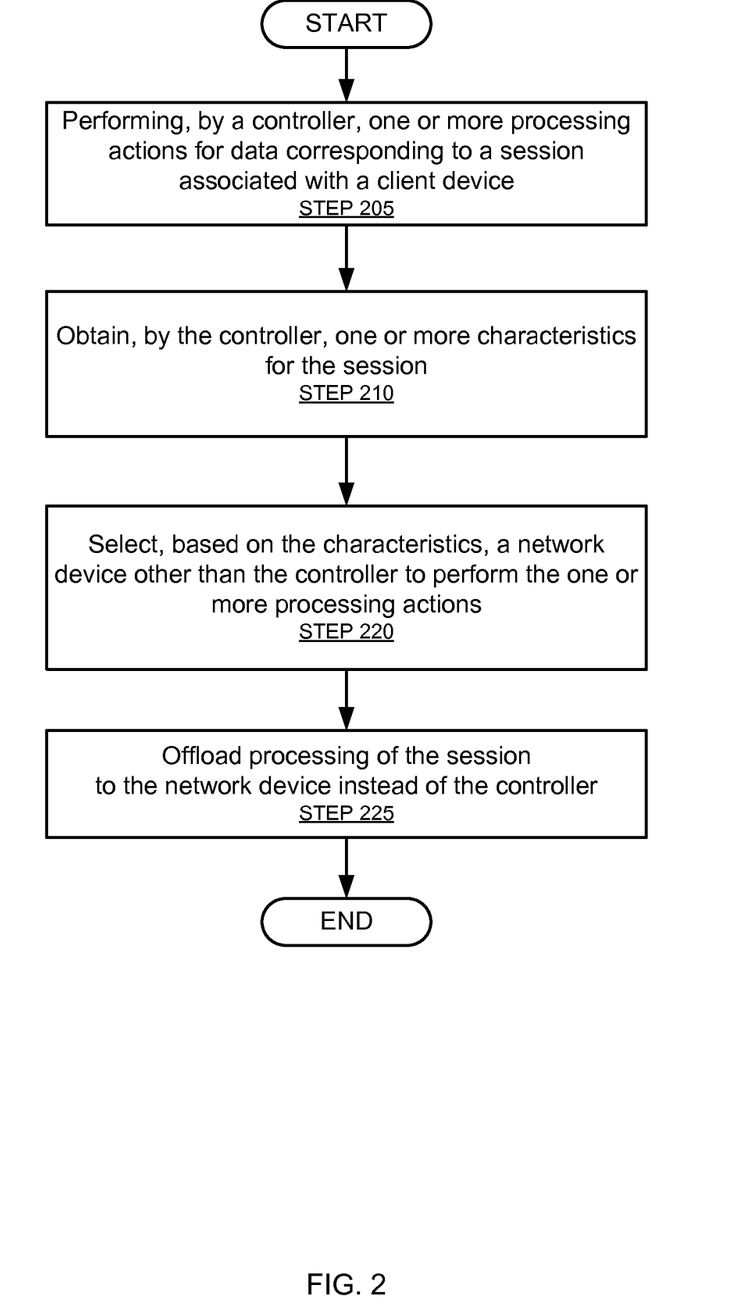
FIG. 2 shows a flowchart in accordance with one or more embodiments.

FIG. 2 shows a flowchart in accordance with one or more embodiments. The process shown in FIG. 2 may be executed, for example, by one or more components (e.g., controller (115), hardware device (110A-110D), etc.) discussed above in reference to FIG. 1. One or more steps shown in FIG. 2 may be omitted, repeated, and/or performed in a different order among different embodiments. Accordingly, embodiments should not be considered limited to the specific number and arrangement of steps shown in FIG. 2.

Initially, the controller performs one or more processing actions on a session (STEP 205). The session corresponds to a stream of packets generated by or destined for a client device. Example sessions include HTTP session, web session, TCP session, etc. Example processing actions may include applying a quality of service (QoS) to the session, redirecting the session to the service (160), encapsulating a packet of the session in a mobility tunnel, dynamic multicast optimization, station state management, authentication and 802.1x, roaming, MDNS proxy, firewall/centralized crypto, sending monitoring feed to monitoring agents (SNMP etc), intrusion detection coordination, ARM channel power coordination, DHCP service, 8021x termination, deep packet inspection, and Voice ALGs and handling voice calls (tag for appropriate prioritization).

In STEP 210, the controller obtains one or more characteristics of the session. Specifically, the controller may obtain some characteristics by inspecting the header of the packet(s). The controller may obtain some characteristics by performing a deep packet inspection. The controller may obtain some characteristics of the packet session from a third-party application and/or a user. Example characteristics include the sender IP address, the destination IP address, the type of the session, the application (e.g., the client device application) generating and/or receiving the packets, a software application port used by the client device to transmit or received the data corresponding to the particular session, etc.

In one or more embodiments, controller is configured to identify the expected amount of data (in bytes, MBs, GBs, etc.) to be transmitted during a session or an actual amount of data already transmitted during the session. This is a characteristic of the session. In one or more embodiments, the controller (115) is configured to identify the expected duration (e.g., in seconds, milliseconds, cardinality of packets, etc.) of a session and/or a value indicating whether an actual duration of the particular session has exceeded a threshold value. These are also characteristics of the session.

In STEP 220, a network device is selected to perform the processing actions. Only network devices having functionality to perform the processing actions are considered. In one or more embodiments, a network device closer to the client device (i.e., shorter distance, fewer hops, etc.) is selected. As discussed above, the controller may have a device DS (e.g., device table) specifying the functionality of each network device in the system. The selection of the network device is made using the device DS and/or the topology of the secondary network (e.g., IP subnet) in which the controller operates. The selected network device may be an access point or a switch.

In STEP 225, processing of the session is offloaded to the selected network device. The controller may offload the processing of the session by configuring hardware (i.e., circuitry), software, and/or firmware of the network device to perform the required processing actions on the session. In one or more embodiments, the controller (115) is configured to offload a session to a network device(s) by populating the key DS of the network device(s) with the key and the processing actions that should be performed on any incoming packets corresponding to the key. Accordingly, the network device(s) will calculate the key (e.g., via a hash function) for any incoming packet, and perform the processing action(s) specified in the key DS of the network device. In short, the offloading causes the network device to perform the one or more processing actions, for the data corresponding to the particular session, instead of the controller.

However, this offloading may only be temporary. In other words, the controller is free to modify (i.e., change the number and type of processing actions) or even revoke all processing actions that have been offloaded to the network device at any time. These modifications and/or revocations may be in response to the changing computational workload of the controller.

Figure 3A:
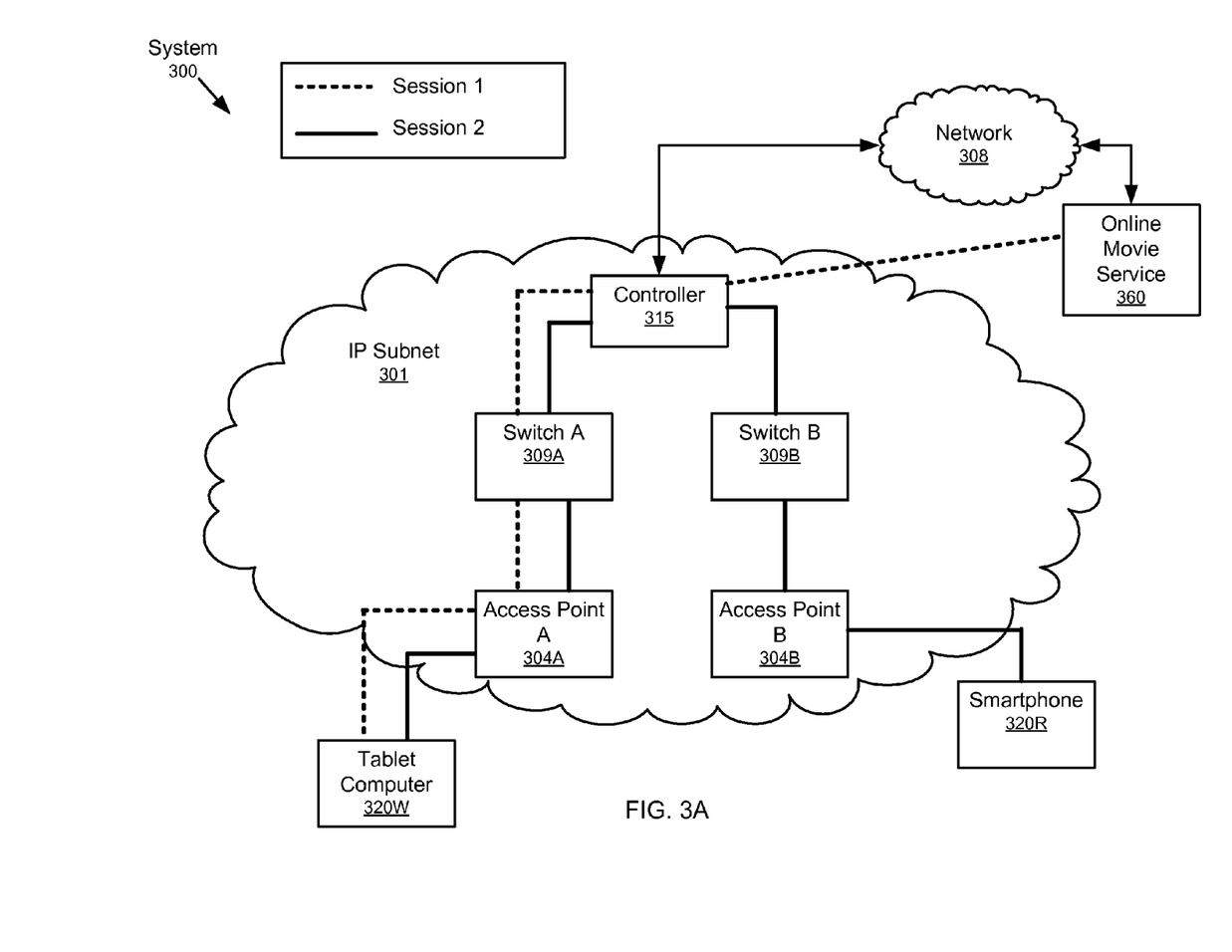
FIG. 3A and FIG. 3B show an example in accordance with one or more embodiments.
Figure 3B:
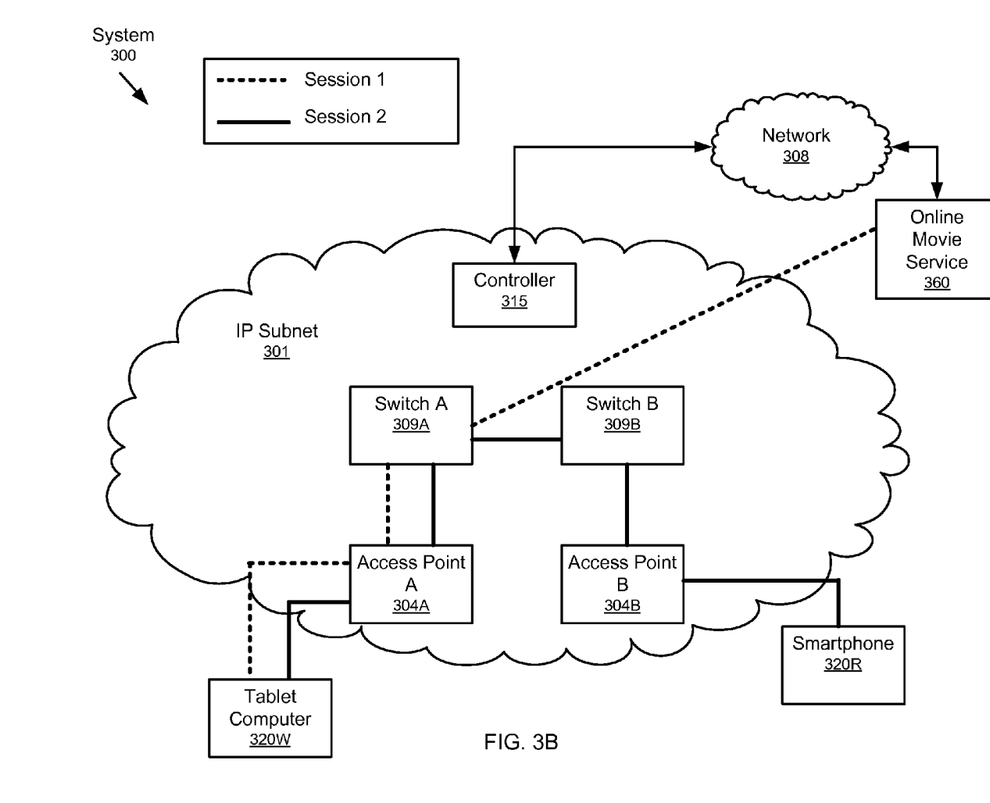

FIG. 3A and FIG. 3B show an example in accordance with one or more embodiments. As shown in FIG. 3A, there exists a system (300) having an Online Movie Service (360), a network (308), and an IP subnet (301). The IP subnet (301) includes a controller (315), multiple switches (i.e., switch A (309A), switch B (309B)), and multiple access points (i.e., access point A (304A), access point B (304B)). A tablet computer (320W) is wirelessly connected to access point A (304A). A smartphone (320R) is wireless connected to access point B (304B). The tablet computer (320W) and the smartphone (320R) are both client devices.

Still referring to FIG. 3A, there exists two sessions (i.e., Session 1, Session 2) associated with the tablet computer (320W). Session 1 is video streaming (i.e., the operator of the tablet computer (320W) is watching a movie). Session 2 is a VoIP call to the user of the smartphone (320R).

As shown in FIG. 3A, the controller (315) is executing processing actions on the packets of both Session 1 and Session 2. Specifically, the controller (315) is handling the tunneling from the online movie service (360) for Session 1. Moreover, the controller is rerouting the packets of Session 2 to switch B (309B), so that they may reach the smartphone (320R).

Now assume that the expected amount of data to be transmitted during the session and expected duration of Session 1 exceeds the corresponding thresholds. This determination was made by the controller (315) based on at least the type (i.e., streaming video) of Session 1. Further, assume that the expected amount of data to be transmitted during the session and the expected duration of session 2 exceeds the corresponding thresholds. This determination was also made by the controller (315) based on at least the type (i.e., VoIP) of session 2. Further still, assume that the controller (315) is overloaded with the processing of these sessions and the processing of other sessions (not shown). Accordingly, the controller (315) is approaching capacity and wants to offload the processing of session 1 and session 2 to another network device in the IP subnet (301).

FIG. 3B shows the offloading of session 1 and session 2 to switch A (309A). Specifically, the controller (315) has determined (e.g., by accessing its device DS) that switch A (309A) has the functionality to perform the processing actions that session 1 and session 2 require. Moreover, the distance between switch A (309A) and the tablet computer (320W) is shorter (i.e., fewer hops), than the distance between the controller (315) and the tablet computer (320W). Accordingly, the controller (315) has configured the hardware (i.e., circuitry), software, and/or firmware of switch A (309A) to perform the required processing actions on the sessions. Specifically, the controller (315) has populated the key DS of switch A (309A) with the keys corresponding to the sessions and the processing actions that should be performed on any incoming packets corresponding to the keys. Accordingly, switch A (309A) now handles the tunneling from the online movie service (360) for session 1 and the rerouting for session 2. This computational burden has been lifted off the controller (315).

Embodiments may have one or more of the following advantages: the ability to reduce the likelihood of overloading a controller by offloading the processing of one or more sessions to other network devices (e.g., switches, access points); the ability for a controller to configure the hardware, software, firmware, or any combination thereof, of a network device to start executing processing actions on packets sessions; the ability to control the operation of a network device by populating a data structure of the network device, etc.

Figure 4:
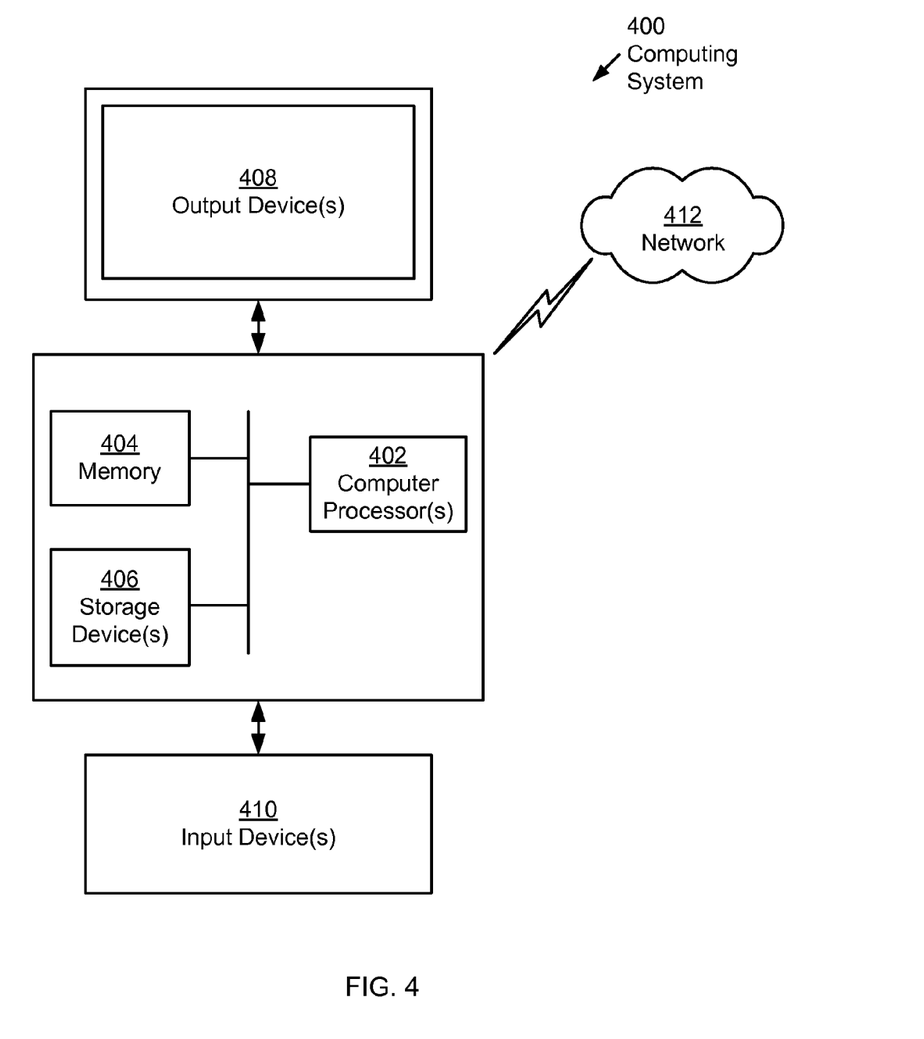
FIG. 4 shows a computer system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (400) may be located at a remote location and connected to the other elements over a network (412). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium (CRM) comprising instructions which, when executed by one or more hardware processors, causes performance of operations comprising:
performing, by a controller, one or more processing actions for data corresponding to a particular session associated with a client device;
identifying one or more characteristics corresponding to the particular session; based on the one or more characteristics corresponding to the particular session wherein the one or more characteristics comprise:
an expected amount of data to be transmitted during the particular session or an actual amount of data already transmitted during the particular session; selecting a network device, other than the controller, to perform the one or more processing actions for the data corresponding to the particular session wherein the network device is selected based at least on (a) a first distance between the network device and the client device and (b) a second distance between the controller and the client device and
causing the network device to perform the one or more processing actions, for the data corresponding to the particular session, instead of the controller.

2. The non-transitory CRM of claim 1, wherein the selecting operation comprises:
identifying a subset of network devices, from a plurality of network devices, that
have functionality to perform the one or more processing actions being performed by the controller; and
selecting the network device from the subset of network devices.

3. The non-transitory CRM of claim 1, wherein the one or more processing actions comprise one or more of:
applying a quality of service (QoS) to the data corresponding to the particular session; redirecting the data corresponding to the particular session;
encapsulating the data corresponding to the particular session for transmission to a destination address;
firewalling the data corresponding to the particular session; managing state information associated with the particular session; authenticating data associated with the particular session;
performing deep packet inspection of data associated with the particular session; or monitoring data associated with the particular session.

4. The non-transitory CRM of claim 1, wherein the one or more characteristics comprise; an expected duration of the particular session or
a value indicating whether an actual duration of the particular session has exceeded a threshold value.

5. The non-transitory CRM of claim 1, wherein the one or more characteristics comprise a type of the particular session.

6. The non-transitory CRM of claim 1, wherein the one or more characteristics comprise a type of the particular session, the type of the particular session comprising a Voice over Internet Protocol (VoIP) session.

7. The non-transitory CRM of claim 1,
wherein the one or more characteristics comprise an application corresponding to the particular session.

8. The non-transitory CRM of claim 1, wherein the one or more characteristics comprise a software application port used by the client device to transmit or receive the data corresponding to the particular session.

9. The non-transitory CRM of claim 1, wherein the network device is one of: a switch and an access point.

10. The non-transitory CRM of claim 1, wherein the operations further comprise:
based on the one or more characteristics corresponding to the particular session: selecting a plurality of network devices, other than the controller, to perform the one or more processing actions for the data corresponding to the particular session;
causing the plurality of network devices to perform the one or more processing actions, for the data corresponding to the particular session, instead of the controller.

11. The non-transitory CRM of claim 1, wherein selecting a network device, other than the controller, to perform the one or more processing actions for the data corresponding to the particular session is further based on a current load of the controller.

12. The non-transitory CRM of claim 1, wherein causing the network device to perform the one or more processing actions comprises:
instructing the network device to perform the one or more processing actions prior to transmitting the data to the controller.

13. The non-transitory CRM of claim 1, wherein causing the network device to perform the one or more processing actions comprises:
forwarding the data, by the controller to the network device, without performing the one or more processing actions on the data.

14. The non-transitory CRM of claim 1, wherein causing the network device to perform the one or more processing actions comprises:
instructing the network device to circumvent the controller for transmission of the data toward a destination device.

15. A system comprising:
at least one device including a hardware processor; the system being configured to perform operations comprising: performing, by a controller, one or more processing actions for data corresponding to a particular session associated with a client device;
identifying one or more characteristics corresponding to the particular session wherein the one or more characteristics comprise an expected duration of the particular session or a value indicating whether an actual duration of the particular session has exceeded a threshold value;
based on the one or more characteristics corresponding to the particular session: selecting a network device, other than the controller, to perform the one or more processing actions for the data corresponding to the particular session wherein the network device is selected based at least on (a) a first distance between the network device and the client device and (b) a second distance between the controller and the client device;
causing the network device to perform the one or more processing actions, for the data corresponding to the particular session, instead of the controller.

16. The system of claim 15, wherein the one or more characteristics comprise an expected amount of data to be transmitted during the particular session or an actual amount of data already transmitted during the particular session.

17. A method comprising:
- performing, by a controller including a hardware processor, one or more processing actions for data corresponding to a particular session associated with a client device;
- identifying one or more characteristics corresponding to the particular session wherein the one or more characteristics comprise a type of the particular session, the type of the particular session comprising a Voice over Internet Protocol (VoIP) session;
- based on the one or more characteristics corresponding to the particular session; selecting a network device, other than the controller, to perform the one or more processing actions for the data corresponding to the particular session wherein the network device is selected based at least on (a) a first distance between the network device and the client device and (b) a second distance between the controller and the client device;
- causing the network device to perform the one or more processing actions, for the data corresponding to the particular session, instead of the controller.

* * * * *